L. V. ARONSON.
THERMOMETER ATTACHING MEANS.
APPLICATION FILED JULY 27, 1916.
1,228,164.
Patented May 29, 1917.
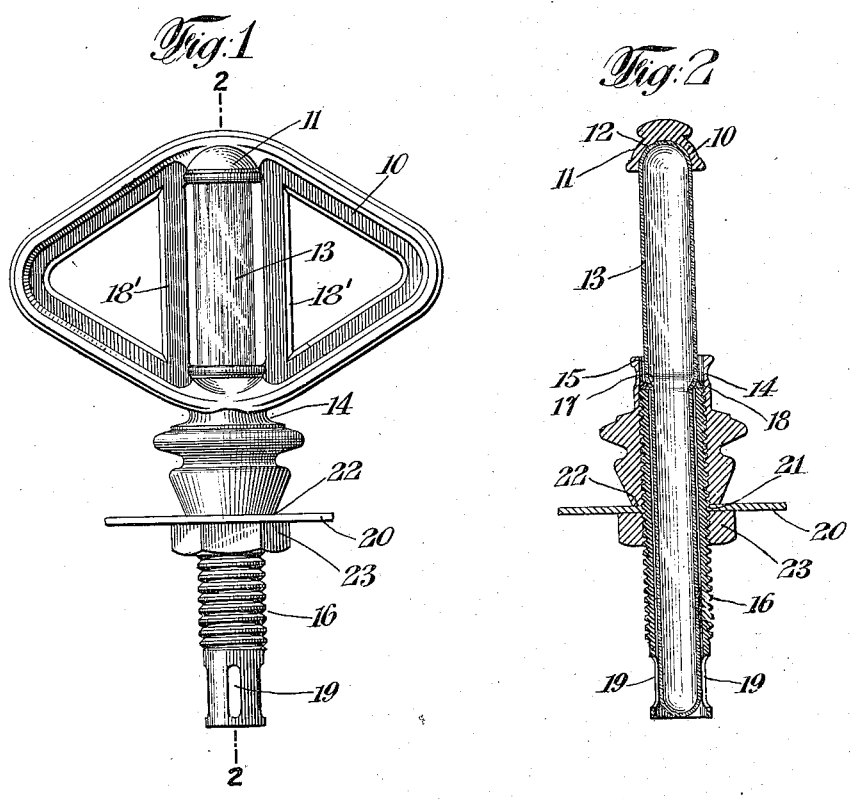
Inventor
Louis V Aronson
By his Attorney

UNITED STATES PATENT OFFICE.

LOUIS V. ARONSON, OF NEWARK, NEW JERSEY.

THERMOMETER-ATTACHING MEANS.

1,228,164.

Specification of Letters Patent.

Patented May 29, 1917.

Application filed July 27, 1916. Serial No. 111,585.

*To all whom it may concern:*

Be it known that I, LOUIS V. ARONSON, a citizen of the United States, and a resident of Newark, in the county of Essex and State of New Jersey, have invented certain new and useful Improvements in Thermometer-Attaching Means, of which the following is a specification.

The invention relates to an improved support and means of protection for fragile members usually tubular, for example, thermometers and other devices adapted to afford a visual indication of a variation in temperature or other physical condition. It has for its object to so mount these members that the same may be conveniently assembled and securely retained in position, and remain at the same time readily removable or replaceable in case of breakage. A further object of the invention is to afford means for detachably securing the member to a tank or the like.

The nature of the invention will be best understood when described in connection with the accompanying drawings, in which—

Figure 1 is a front elevation of one embodiment of the invention.

Fig. 2 is a vertical section taken on the line 2—2, Fig. 1.

Similar characters of reference designate corresponding parts throughout the several views.

Referring to the drawings, 10 designates a suitable protecting framing, herein shown diamond-shaped; but it will be understood that the same may be of any desired configuration. At the upper corner or angle thereof, there is provided a slight inward projection 11 having a suitable socket or cavity 12 designed to receive the inner end of a tube or other fragile member 13, the latter being herein shown and described as a temperature-indicating member filled with a liquid responsive to temperature variations, undergoing a change of color under such variations. For this purpose, a liquid such as described in application filed jointly by me and Alexander Harris the 1st day of July, 1916, Serial No. 107,071, may be employed, said liquid consisting, for example, of a solution of fifteen (15) parts by weight of cobalt chlorid, fifteen (15) parts by weight of sodium chlorid and seventy (70) parts by weight of water. The opposite corner or angle is formed with an outwardly projecting extension 14 suitably tapped and registering with an opening 15 through the said framing 10. Through this opening and tapped extension is to be inserted an externally-threaded tube or sleeve 16 which, upon being turned in one direction, is caused to be advanced inwardly and is adapted to retain member 13. The said member may be for this purpose of reduced diameter at its outer portion to provide a shoulder 17 resting upon the inner end of said tube 16. If desired, a suitable washer 18 may be inserted between the shoulder 17 and the inner end of tube 16. The latter is inserted sufficiently to force the inner end of the thermometer 13 into the socket 12 provided therefor, which will serve to rigidly retain the various parts in the proper position, and still allow of the ready removal of the thermometer tube, if necessary. Lateral protection pieces 18' may be disposed alongside the tube, if desired. The lower end of tubular member 16 is provided with slots 19 to permit of direct contact of the medium (not shown) into which the end of the thermometer bulb is to be placed. The frame as a whole with retained thermometer or the like may be secured to a tank wall 20 or other fixed support, for example, the cap of the filling mouth of an automobile radiator, by passing the outer end of tubular member 16 through a corresponding opening 21 of the wall 20, which latter bears with one face against a shoulder 22 of extension 14 and with the other face against a tightening nut 23 over the end of said tube 16.

I claim:

1. The combination with a tubular temperature responsive member and a frame therefor, the latter being provided with a suitable socket to receive one end of the member and with an opening through which said member may pass, said member being provided with a shoulder between its ends; of a threaded sleeve surrounding the one end of said member and adapted to engage the said shoulder thereof to support the said member and to advance the same inwardly toward the said socket, as said sleeve is rotated in one direction, whereby the said tubular member may be securely retained by said frame and be readily removable therefrom.

2. The combination with a frame provided with a projection extending toward the center of said frame and affording a socket and provided with a tapped extension piece extending beyond said frame in the axis of said socket; of a tubular temperature responsive member whose inner end fits said socket and its outer end passes through said tapped extension, said member being provided with a shoulder between its ends; and an externally-threaded sleeve fitting said tapped extension, surrounding the one end of said member and adapted to engage the said shoulder thereof to support said member and to advance the same inwardly with respect to said frame and to the socket thereof.

3. The combination with a frame provided with a projection extending toward the center of said frame and affording a socket and provided with a tapped extension piece extending beyond said frame in the axis of said socket; of a tubular temperature responsive member whose inner end fits said socket and its outer end passes through said tapped extension; an externally-threaded sleeve fitting said tapped extension, surrounding the one end of said member and adapted to engage and support the same to advance it inwardly with respect to said frame and to said socket thereof; and a perforated wall through which said sleeve member passes, one face of the former engaging said tapped extension, and a nut fitting over the outer end of said sleeve to engage the other face of said wall to lock the said frame thereto.

Signed at Newark, in the county of Essex and State of New Jersey, this 25th day of July, A. D. 1916.

LOUIS V. ARONSON.